Figure 2:
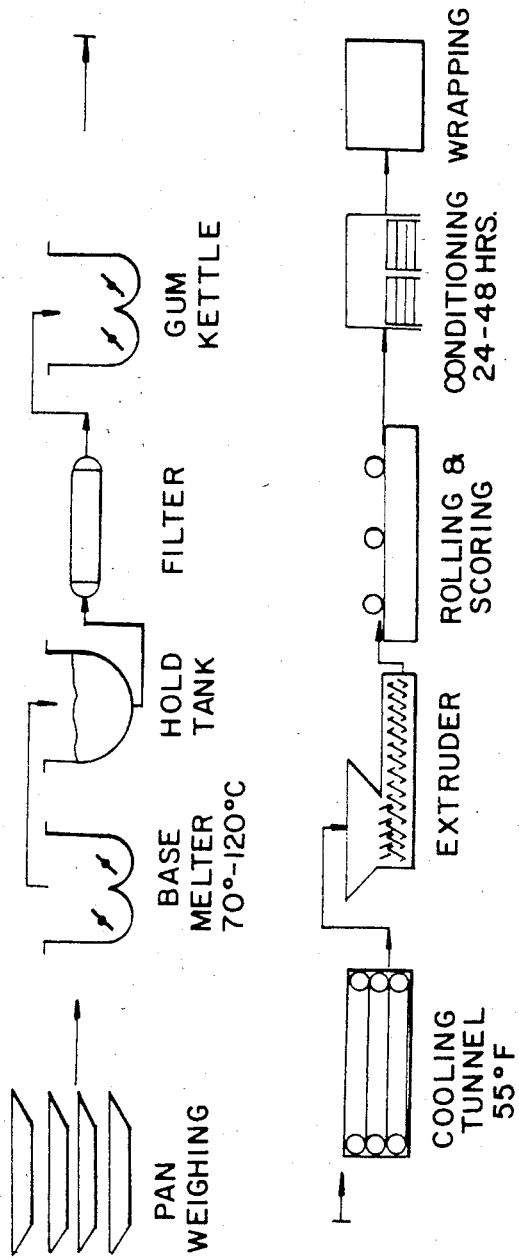

United States Patent [19]

Cherukuri et al.

[11] Patent Number: 4,587,125
[45] Date of Patent: May 6, 1986

[54] NON-STALING CHEWING GUM COMPOSITIONS AND IMPROVED METHOD OF PREPARATION

[75] Inventors: Subraman R. Cherukuri, Towaco, N.J.; Frank T. Hriscisce, Astoria, N.Y.; Albert E. Siecke, Westfield, N.J.; You C. Wei, Bethlehem, Pa.

[73] Assignee: Warner-Lambert Company, Morris Plains, N.J.

[21] Appl. No.: 740,146

[22] Filed: May 31, 1985

Related U.S. Application Data

[63] Continuation-in-part of Ser. No. 644,734, Aug. 27, 1984.

[51] Int. Cl.⁴ .............................................. A23G 3/30
[52] U.S. Cl. .............................................. 426/3; 426/5
[58] Field of Search ................................... 426/3-6

[56] References Cited

U.S. PATENT DOCUMENTS

| | | | |
|---|---|---|---|
| 3,985,298 | 10/1976 | Nichols | 426/3 |
| 4,150,161 | 4/1979 | Rudolph et al. | 426/3 |
| 4,187,320 | 2/1980 | Koch | 426/3 |
| 4,497,832 | 2/1985 | Cherukuri et al. | 426/5 |
| 4,514,422 | 4/1985 | Yang et al. | 426/3 |

FOREIGN PATENT DOCUMENTS 0082670  6/1983  European Pat. Off. ............... 426/3

*Primary Examiner*—Jeanette Hunter
*Attorney, Agent, or Firm*—Daniel A. Scola, Jr.; Gary M. Nath

[57] ABSTRACT

A chewing gum composition and process whereby the process comprises softening the base between a temperature range of about 40° C. to about 60° C.; admixing softening agents, sweetening agents and flavoring agents; extruding the composition prior to cooling; forming the composition into suitable chewing gum pieces without cooling; and immediately wrapping the pieces with a minimum of protective wrapping without prior conditioning. No moisture or moisture-containing ingredients are used in the process or added to the ingredients and the chewing gum composition has a final moisture content of up to about 0.9% by weight.

14 Claims, 7 Drawing Figures

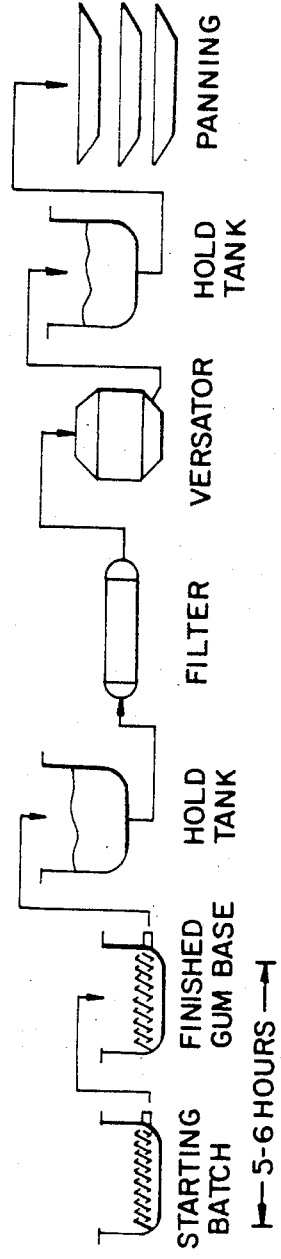
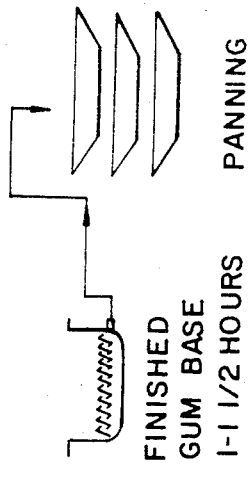
FIG. 1

CURRENT COMMERCIAL CHEWING GUM PROCESS (PRIOR ART)

INVENTIVE CHEWING GUM PROCESS

NON-STALING CHEWING GUM COMPOSITIONS AND IMPROVED METHOD OF PREPARATION

This application is a continuation-in-part of copending U.S. Ser. No. 644,734, filed Aug. 27, 1984.

The present invention concerns a novel chewing gum composition and method of preparation and more particularly to natural sweetener-containing chewing gum compositions being substantially free from water and having advantageous process characteristics and shelf life stability. The chewing gum compositions form chewing gums which have exceptionally long periods of shelf life without protective packaging and without the use of humectics as traditionally used in the art.

The present invention also concerns a chewing gum composition which, unlike those of the prior art, can be processed using fewer steps, thereby saving time and production costs. The process of the present invention does not require such traditional process steps as cooling and conditioning (setting), nor does it require specified relative humidity conditions for coated gums, as does the prior art. Additionally, no protective wrapping is necessary to maintain freshness. The inventive compositions do not require water or moisturecontaining additives in order to obtain a formulation viscosity which is manageable and homogeneous, and which ultimately yields a chewing gum product which has excellent texture, mouthfeel and organoleptic properties. The present compositions, when prepared in the specified manner, have the juiciness, flavor, texture, mouthfeel and other organoleptic characteristics of the prior art, which uses moisture or moisture-containing ingredients to achieve these characteristics.

Another advantage of the instant invention is that those ingredients which are ordinarily unstable in the presence of moisture, e.g., aspartame, do not present a problem, since the inventive compositions are substantially anhydrous. Thus, such traditionally moisture-unstable ingredients can be added without fear of deterioration or instability.

Another advantage to the instant invention is that gum product formed from the inventive compositions and using the inventive method can be wrapped immediately after forming without the need for conventional cooling followed by conditioning for 24 to 48 hours. The inventive compositions can be wrapped immediately within 2 hours of rolling without fear of wrapping materials adhering to the chewing gum product.

Another advantage of the instant invention is that chewing gum products formed by means of the inventive process and containing the inventive compositions can remain without wrapping or protective covering at ambient temperatures for longer periods of time than traditional chewing gums without going stale, becoming tacky or showing instability. Thus, the inventive compositions retain their freshness for up to a year or more without the need for protective, hermetic wrappings.

Other advantages of the inventive compositions and process of preparation will become apparent from the detailed description provided herein.

Conventional chewing gum process steps disclosed in the prior art ordinarily involve formulating the chewing gum composition at temperatures between about 70° to 120° C., followed by cooling, extruding, forming into gum pieces and finally conditioning (setting) for 24 to 48 hours. Additionally, if the chewing gum is to be a hard sugar-coated gum piece (e.g., a pellet or ball), usually 48 hours of conditioning at 66°–70° F./RH 47–55%, is required prior to the application of the coating. It is traditionally necessary to apply the coating under controlled temperature conditions (80°–85° F.) at low relative humidity (RH 24–40%). These conditions must be maintained closely or serious processing problems result. For example, changes in the temperature and humidity outside these ranges cause softening of the gum and deformation of shape which makes coating difficult. This problem has been well known for many years and is especially harmful in areas with extreme climates such as the tropics. If the chewing gum is formed as a slab or stick gum, one prior art method required immediately wrapping the gum subsequent to 24–48 hour conditioning such that the gum product would retain its freshness.

Additionally, conventional gum processes, which use traditional high speed wrapping machines (e.g., 800-1800 sticks or slabs per minute), require the wrapping to be done at controlled temperature and humidity conditions. If the temperature or humidity becomes too high, the chewing gum composition would stick to the rollers and cutters. The individual gum pieces would be wrapped in air-tight packages and usually those would be placed in larger boxes which themselves would be sealed to keep out air and moisture. In spite of all these precautions during processing, conventional chewing gum tends to stick to wrappers at high temperatures and to become brittle at low temperatures during storage. Additionally, conventional mint flavored chewing gum and some fruit flavors undergo oxidation of the flavors due to the interaction of the flavor with the base in the presence of moisture. The results is a stale product. The instant moistureless chewing gum compositions and process of preparation solve these problems.

As stated above, the inventive process does not require all of the process steps of the prior art. The chewing gum compositions once formed do not have to be cooled prior to formation into gum pieces, nor conditioned prior to wrapping. These advantages are due to the specific and novel formulations presented herein.

The prior art has disclosed chewing gum compositions which have low percentages of moisture in the final product. For the most part, the prior art has concentrated on driving off the water once the chewing gum formulation has been made. Thus, the prior art compositions ordinarily contain water and/or moisture-containing ingredients, e.g., sorbitol solution, corn syrup solutions, etc., and would therefore require heating or purification of the composition to drive off water and obtain a certain moisture content. For example, U.S. Pat. No. 4,035,572 involves a gum base formulation with less than 0.5% moisture. This low percentage of moisture is due to the purification process which removes water and solvent from the gum base.

U.S. Pat. No. 4,382,963 involves a low calorie chewing gum which uses polydextrose as the sole soluble bulking agent. The moisture content in the final product is about 1 to 5% and this is obtained by omitting the aqueous component, e.g., sorbitol syrups or corn syrups, which is normally used in chewing gum products.

U.S. Pat. No. 3,262,784 concerns a chewing gum composition has less than 1% moisture in the final product due to heating between about 170° and 250° F. to drive off the water.

U.S Pat. No. 4,150,161 concerns a two component confection having a carbonated candy component and a pliable bubble gum component with each component having a controlled water activity between 0.1 to 0.3 and which is capable of surviving long periods of storage when packaged in a moisture resistant material.

Conventional chewing gum formulations generally have a molten chewing gum base, resins, waxes, fillers, emulsifiers, an aqueous sugar syrup (corn syrup or sorbitol syrup), dry sugar (sucrose or dextrose) and flavor. The aqueous sugar syrup or non-sugar syrup has always been believed to be a necessary component, as far as conventional commercial manufacture is concerned. As a result, the chewing gum product would ordinarily contain 2% to 7% by weight of moisture. Moreover, ingredients such as humectant were often required in order to retain the moisture of the chewing gums and obtain a reasonable commercial shelf life, thereby insuring freshness to the purchaser. The compositions of the instant invention do not use humectants (moisture-retaining ingredients) nor aqueous solutions (moisture-containing ingredients) and therefore do not suffer from loss of moisture to the atmosphere.

The chewing gum compositions of the instant invention have a moisture content of up to about 0.9% by weight of the final composition and comprise a gum base which softens in a temperature range of about 40° to about 60° C., a flavoring agent, preferably but optionally absorbed in the microporous channels of water-soluble spherical particles, a solid water-soluble sweetening agent, said ingredients containing only residual moisture and being added to the composition without additional moisture, i.e. without the use of aqueous solutions. The final chewing gum composition has an equilibrium relative humidity value lower than the ambient relative humidity.

There are several critical aspects to the instant invention. One such criticality is the requirement of a soft gum base, e.g., one which softens in the temperature range disclosed above. Traditionally, gum bases were employed which melted in a range of 70°-120° C. While the gum bases of the instant invention are well known in the art, they must not be heated beyond the softening point of 60° C. Thus, while various combinations of these known soft gum bases may be used, the particular combination employed must not be such that its softening point is above about 60° C.

Another such criticality is the total moisture content and the equilibrium relative humidity value of the chewing gum composition. Moisture related product degradation is one of the prime stability concerns for chewing gum compositions and products. The environmental factor influencing moisture loss or gain is relative humidity. It is commonly accepted that the lower the relative humidity, the faster things dry out. Relative humidity (RH) is a measure of the vapor pressure exerted by the moisture in the atmosphere. As relative humidity increases or decreases, the pressure of the moisture in the atmosphere increases or decreases accordingly. Pure water exerts a moisture vapor pressure equivalent to 100% RH. As such, that water will evaporate when stored in any environment less than 100% RH. If impurities are added to that water, the moisture vapor pressure will decrease.

Equilibrium relative humidity (ERH) measurements were taken for the inventive compositions. ERH is a means of identifying the susceptibility or propensity of the composition to moisture gain or loss, which in turn relates to the tendency for the gum to remain moisture-stable and to not dry out or become stale. When the product neither picks up nor loses moisture, it is in a state of equilibrium with the environment. The ERH measurement depends on the ratio of free moisture to bound moisture in a product and the temperature. The amount and rate at which a chewing gum loses or gains moisture depends on the differential between the product's ERH and ambient RH. The transfer of moisture will be in the direction from high to low RH until an equilibrium state is reached.

The inventive chewing gum compositions have a low ERH and therefore tends not to lose moisture, since most environments have a higher RH than the compositions ERH. For example, the RH of most geographic regions is between 35-45% depending on the time of year. If the ERH of the chewing gum is greater than the ambient relative humidity, the gum will lose moisture and dry out. The ERH range of the inventive compositions, however, are between about 15% to about 30%, and preferably about 21 to about 25% at room temperature, e.g. about 23° C. Thus, there is no tendency for chewing gum made from the inventive compositions to dry out. Rather, the tendency, if any, would be to pick up moisture during shelf life. Too much moisture pick up is undesirable however, since it causes wetting of the gum, loss of sugar coating and water solubles and ultimately sticking of the wrapper to the gum. Thus, a delicate moisture balance must be maintained whereby the product's ERH is maintained at a low value relative to the ambient relative humidity; and the total moisture content kept at a maximum of about 0.9% by weight, and preferably about 0.3%. Thus, the advantages of the instant chewing gum compositions of long shelf life and freshness stability, is believed to be due to the critical aspects of:

(a) omitting moisture and moisture containing ingredients in the chewing gum formulations;

(b) maintaining the ERH of the chewing gum composition at a lower level than the ambient relative humidity; and (c) using a gum base which softens between the temperatures of about 40° C. and 60° C.

The inventive chewing gum compositions preferably but optionally contain an edible good material which is capable of being formed into particles having microporous channels. Flavoring liquid is absorbed into the microporous channels of the particles. The products have preferred low bulk densities in the range of about 3.0 to about 8 lb./ft.$^3$ and preferably about 3.0 to about 6.0 lb./ft.$^3$. Materials, not having low bulk densities, coupled with microporous channels have been found not suitable for use in the inventive formulations. Such materials have been found to quickly release the flavoring from the formulation and fail to sustain flavor-sweetness duration. U.S Pat. No. 4,497,832 discloses chewing gums having flavor sorbed in the microporous channels of spherical particles wherein the channels increase the sorptive surface area. These gum compositions, however, lack the additional criticalities of the instant invention.

The optionally included spherical particles of the invention may be produced from a wide range of materials. Without being limited thereto, illustrative materials are carbohydrates such as the dextrins, starch, pectin, algin, methyl cellulose, carboxy methyl cellulose, carboxy methyl amylose, carboxy methylamylopectin, dextrose, fructose, maltose, lactose, dextrins, natural gums and mixtures thereof. Exemplary natural gums include tragacanth, acacia, arabic, locus bean, caraya, and carragean. The fine, porous nature of the spherical particles immediately absorb moisture from saliva when the chewing gum product is masticated. The particles swell and import a juiciness to the gum.

Such materials are commercially available and may be prepared by a number of methods. Once such method involves spray drying previously expanded particles in a heated zone. For illustrative purposes, however, a preferred process for preparing the spherical particles useful in the instant formulations is described in U.S. Pat. No. 80,593 to Cohan, which reference teachings are incorporated herein by reference. Briefly the reference process involves spraying a flowable composition in the presence of a blowing agent, such as ammonium bicarbonate or other substance capable of becoming gaseous in situ, to form beads, subjecting the beads to a heated zone to expand the beads by expansion of gases within the interior of the beads, and cooling the resulting expanded beads to stop further expansion and aid in control of bulk density. Carbon dioxide and nitrogen are other useful blowing agents.

Another useful method of producing materials having microporous channels is disclosed in U.S. Pat. No. 4,310,560, wherein finely divided particulate edible materials which acquire surface stickiness when moistened are mixed with a leavening system containing sodium bicarbonate and a leavening acid. This mixture is sprayed with an aqueous liquid while the particulate materials are tumbled and rolled to form agglomerates. The agglomerates are then heated with a hot air stream between 51°–135° C. to cause the release of carbon dioxide gas from the leavening system. The release of the gas causes the final particles to be porous in nature.

The spherical particles are employed in the chewing gum composition in amounts of about 0.1% to about 12% by weight and preferably about 0.5% to about 6% by weight based on the weight of the final formulation. Amounts less than 0.1% fail to achieve enhanced flavor and sweetness perception whereas amounts higher than 12% does not achieve a pleasing flavor sweetness release.

The preferred spherical particle for use with this invention is a maltodextrin. This maltodextrin is distinct from known maltodextrins which have distinct particle sizes and are void of a microporous channel structure. Such conventional maltodextrins or corn syrup solids as they are commonly referred to, have bulk densities from 15 to 46 lb./ft.$^3$ and D.E. values from 7 to 38. Such materials are unsuitable for use in the present invention in lieu of the microporous particles. It should be recognized that such maltodextrins may be used in the instant formulations in addition to the spherical microporous particles. When used in this manner, they may be used in conventional amounts well known to the skilled inventor.

Flavoring agents well known to the chewing gum art may be added to the chewing gum compositions of the instant invention. These flavoring agents may be chosen from synthetic flavor oils, flavorings and/or oils derived from plants, leaves, flowers, fruits and so forth, and combinations thereof. Representative flavor oils include: spearmint oil, cinnamon oil, oil of wintergreen (methylsalicylate) and peppermint oils as well as their flavoring replacements. Also useful are artificial, natural or synthetic fruit flavors such as citrus oil including lemon, orange, grape, lime and grapefruit and fruit essences including apple, strawberry, cherry, pineapple, banana and so forth. Other fruit flavors well known to the art are also employable. Mixtures can be employed.

The amount of flavoring agent employed is normally a matter of preference subject to such factors as flavor type, base type and strength desired. In general, amounts of about 0.05% to about 3.0% by weight of the final chewing gum composition are useable with amounts of about 0.3% to about 1.5% being preferred and about 0.7% to about 1.2% being most preferred.

Those elastomers useful in the soft gum bases of instant invention include, but are not limited to, isobutylene-isoprene copolymers, polyvinylacetate, polyisobutylene, polyvinylalcohol, SBR, natural rubbers such as chicle, jelutong, balata, crown gum, guttapercha, lechicaspi, sorva and the like and mixtures thereof. When using a combination of elastomers, the total elastomer mixture must be capable of being softened within the range of about 40° C. to about 60° C., preferably about 45° to about 57° C., and most preferably about 50° to about 55° C. The process of softening is meant to be distinct from the traditional melting of gum bases. By the term "softened" is meant the gum base is heated to a semi-viscous state, wherein the viscosity is relatively high and the base has better film forming and stretching characteristics than bases which are melted. Additionally, the lower temperature used to soften the base does not melt the sugar and other materials added to the gum base and as such there is believed to be little chemical interaction between the base and these materials. The conventional bases on the other hand, are heated to higher temperatures to cause the gum base to liquify (melt). The melted base has a much lower viscosity than the inventive softened bases and as such has less of a film forming, stretching quality. Additionally, sugars and dissolvable materials also melt along with the elastomers. These materials often recrystallize out later on, making the product brittle.

The amount of gum base employed will vary greatly depending on various factors such as the type of base used, consistency desired and other components used to make the final product. In general, amounts of about 5% to about 65% by weight of the final chewing gum composition are acceptable for use, with preferred amounts of about 15 to about 40% and more preferably about 18% to about 35% by weight being suitable.

The gum base composition may contain elastomer solvents to aid in softening the rubber component. It is important, however, that these components be substantially free from water, since the final composition is to have a maximum moisture content of about 0.3% by weight. Such elastomer solvents may comprise the methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated methyl ester of rosin and mixtures thereof. The solvent may be employed in an amount ranging from about 10% to about 75% and preferably about 45% to about 70% by weight of the gum base.

A variety of traditional ingredients used as plasticizers or softeners such as lecithin and the like, may also be incorporated into the gum base to obtain a variety of desirable textures and consistency properties. These additional materials are generally employed in amounts of up to about 30% by weight and preferably in amounts of from about 3% to about 7% by weight of the final gum base composition. Mixtures of such ingredients can be used.

The chewing gum compositions generally contain a major portion of a solid natural sweetening agent selected from the group consisting of mono-, di- and polysaccharides and mixtures thereof. Other dry watersoluble artificial sweetening agents may be used in conjunction with the solid natural sweeteners. The term "natural" sweeteners includes naturally occuring sweeteners which are artificially made, as well as those which naturally occur. Without being limited to particular sweeteners, representative illustrations encompass:

A. Water-soluble natural sweetening agents such as monosaccharides, disaccharides, and polysaccharides such as xylose, ribose, glucose, mannose, galactose, fructose, dextrose, sucrose, sugar, maltose; polyhydric alcohols such as sorbitol, mannitol, xylitol; and mixtures thereof.

B. Water-soluble artificial sweeteners such as the soluble saccharine salts, i.e., sodium or calcium saccharin salts, cyclamate salts, acesulfame-K and the like, and the free acid form of saccharin.

C. Dipeptide based sweeteners such as L-aspartyl-L-phenylalanine methyl ester and materials described in U.S. Pat. No 3,492,131 and the like.

The water-soluble solid natural sweeteners described in category A above, are preferably used in amounts of about 25% to about 75% by weight and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The chewing gum compositions of this invention may additionally include the conventional additives of coloring agents such as titanium dioxide; additional fillers such as aluminum hydroxide, alumina, aluminum silicates: gum base fillers such as talc and calcium carbonate and combinations thereof; and additional emulsifiers such as glycerol monostearate. The amount of filler in the gum base should remain within the range of about 10 to about 25% by weight of the gum base.

The inventive process of making a chewing gum comprises the steps of:

(a) softening the gum base using a temperature in the range of about 40° C. to about 60° C.;

(b) admixing a sweetening agent and a flavoring agent, said flavoring agent being absorbed in the microporous channels of water-soluble spherical particles continuing to mix until a homogenous, pliable mixture is obtained;

(c) extruding the composition prior to cooling;

(d) forming the composition into suitable chewing gum pieces without cooling; and (e) wrapping without prior conditioning the substantially moistureless chewing gum.

The gum bases of the inventive compositions and process, due to their unique softening characteristics between the ranges disclosed above, can be made in most chewing gum mixing kettles without the special requirements of traditional gum base kettles.

FIG. 1 shows both the current (prior art) commercial process of making gum base, as well as the inventive process. Whereas the prior art process required masticating and melting of the gum base in a two-step starting batch/finished batch process usually requiring 5-6 hours, the inventive process requires only softening of the gum base in a one-step process taking about 1-1½ hours. It is significant that the inventive process saves considerable time and energy over the prior art process since this saving can be reflected in significant cost savings, more efficient production, as well as a higher quality chewing gum.

FIG. 2 shows processes for making chewing gum for the prior art. As depicted, the prior art melts the gum base, mixes in other chewing gum composition ingredients, and cools the mixture prior to extrusion. Additionally, prior to wrapping, the prior art compositions are conditioned for 24-48 hours.

Figure 3:
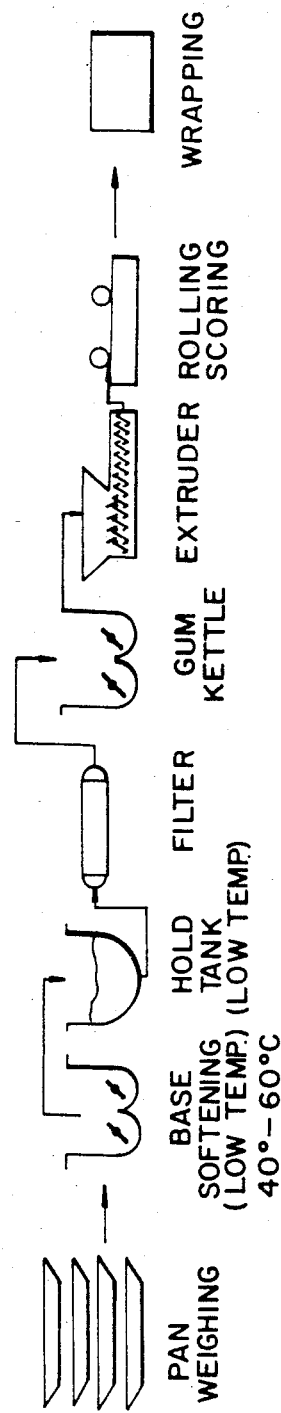

The inventive process depicted in FIG. 3, however, does not require cooling prior to extrusion, nor does it require conditioning prior to wrapping. This process can be modified by softening the base directly in the gum kettle, followed by extruding, rolling and scoring and wrapping. Additionally, the gum base can be first softened by other means such as in an oven, then placed in the kettle and extruded.

The inventive chewing gum compositions and the inventive process are mutually dependent on one another and the benefits of the invention as a whole result from this mutual dependence. Thus, the gum base must have a softening range of between about 40° C. and about 60° C. to be useful in the inventive process. Additionally, to be able to carry out the process as described, no additional moisture is added. The only moisture present is residual moisture, most of which is believed to be bound moisture, inherent in certain ingredients. The total residual moisture must not yield a chewing gum composition and product outside of the range recited. Thus, the final chewing gum composition has a moisture content of up to about 0.9% by weight without any processing steps directed to drying or removing of moisture. The term substantially moistureless refers to this moisture content.

Chewing gum products made by the inventive process and using the inventive formulations have remained fresh, soft and pliable for one year or more with a minimum of protective packaging. For example, unwrapped sticks of chewing gum have remained soft, pliable and have retained their quality and freshness for a year or more in the open air or in unsealed pouches. This advantage is attributable to the combination of chewing gum ingredients processed in the manner described.

The instant invention therefore contemplates a chewing gum composition which remains fresh for a year or more with a minimum of protective wrapping, having a moisture content of up to about 0.9% by weight and being capable of being extruded, formed, coated and wrapped without cooling or conditioning, said composition comprising:

(a) a gum base having a softening range of about 40° C. to about 60° C.;

(b) a flavoring agent and a sweetening agent absorbed into the microporous channels of water-soluble spherical particles; said ingredients containing only residual moisture; said composition having a equilibrium relative humidity lower than the ambient humidity and said composition being prepared by the process comprising:
(i) softening the gum base in a temperature range of about 40° C. to about 60° C.;
(ii) admixing sweetening agents and flavoring agents:
(iii) extruding the composition;
(iv) forming the composition into suitable
(v) wrapping the pieces without prior conditioning.

The instant inventive compositions in combination with the inventive process may be formed into stick, slab, pellet, pillow, center-filled, chunk, sugar-coated or other gum form.

The following examples are given to illustrate the invention, but are not deemed to be limiting thereof. All percentages given throughout the specification are based upon weight unless otherwise indicated.

EXAMPLE ONE

Table I shows various chewing gum formulations of the instant invention as well as those of the prior art.

Chewing gum pieces were made using inventive formulations A–J and using the inventive process described above. The freshly made gum pieces were then tested for taste, chew, texture, softness, flavor, sweetness and other organoleptic characteristics by a group of expert panelists. The freshly made gum was judged to be as good or better than the comparable commercial chewing gums.

Other freshly made gum pieces were put through a series of stability tests including naked exposure to air for long periods of time, accelerated aging tests, humidity tests, cycling tests and so forth, all of which are described below.

TABLE I

SUGAR CHEWING GUM FORMULATIONS
(% by weight of total composition)

| Ingredients | Prior Art | | Inventive | | | | | |
|---|---|---|---|---|---|---|---|---|
| | I | II | A | B | C | D | E | F |
| Gum Base | 21 | 25 | 37.5 | 28.0 | 31 | 20 | 31 | 25 |
| Corn Syrup (aqueous solution) | 16 | 20 | — | — | — | — | — | — |
| Sugar | 60.8 | 51.1 | 51.[1] | 66.3[2] | 67.0 | 70 | — | 41 |
| Dextrose* | — | — | 6.0 | — | — | — | 65 | 20 |
| Fructose | — | — | — | — | — | — | — | 10 |
| Softener | 0.7 | 2.0 | 0.25 | 0.3 | 0.5 | 1.0 | 1.0 | 1.0 |
| Flavor | 1.5 | 1.9 | 1.5 | 1.35 | 1.5 | 1.0 | 1.5 | 1.5 |
| Spherical particles having micropores | — | — | 4.0 | 3.0 | — | 8 | — | — |
| Gum arabic powder | — | — | — | — | — | — | 2 | 1.5 |

*Powdered mixture (fine and/or course)
[1]Actual value 50.975
[2]Actual value 66.35

TABLE II

SUGARLESS CHEWING GUM FORMULATIONS
(% by weight of total composition)

| Ingredients | Prior Art | | Inventive | | | |
|---|---|---|---|---|---|---|
| | III | IV | G | H | I | J |
| Gum Base | 20 | 30 | 28 | 22 | 35 | 50 |
| Sorbitol solution | 12 | 8 | — | — | — | — |
| Sorbitol powder | 65.7 | 50.35 | 53.9 | 50.8 | 54.975 | 29.8 |
| Mannitol powder | — | 5.0 | 8 | 12 | — | 10 |
| Softener | 1.0 | 5.0 | 10 | 15 | 8 | 10 |
| Sweetener | 0.1 | 0.15 | | | | |

TABLE II-continued

SUGARLESS CHEWING GUM FORMULATIONS
(% by weight of total composition)

| Ingredients | Prior Art | | Inventive | | | |
|---|---|---|---|---|---|---|
| | III | IV | G | H | I | J |
| Flavor | 1.2 | 1.5 | 0.1 | 0.2 | 0.075 | 0.2 |

Non-Staling Test

Unwrapped chewing gum pieces made by the inventive process and using each of the inventive formulations A–J (Tables I and II) were allowed to sit in open air at ambient temperature for 12 months.

Other commercially available comparable chewing gum pieces were allowed to stand in the same manner and at the end of this period compared to the inventive chewing gum products by an expert panel. The commercially available chewing gum products were found upon visual inspection to be cracked, hard and brittle. Chewing was difficult and flavor and texture exhibited a stale quality. Overall, the prior art chewing gum was found to be undesirable and unfit for consumption.

The chewing gum products of the instant invention, however, retained their flexibility, softness and flavor and tasted fresh as if newly made.

Accelerated Aging Tests

Unwrapped chewing gum sticks formed from the inventive process and using inventive formulations A–C were exposed unwrapped at 23° C./25% RH for 2, 4, 6, 8, 12, 16 and 26 weeks. The current comparable commercial chewing gum was subjected to these same environmental tests.

Subsequent to exposure the chewing gum pieces were evaluated for hardness using an Instron machine. The gum piece is held in place impaled with a plunger apparatus connected to the instron arm, and the highest point of resistance before the gum piece fails is recorded in pounds. The harder, e.g., the more stale and brittle the gum piece is, the more force is required to enter the gum. It is this force (pounds) which is taken as the indicator of the hardness of the gum.

Figure 4:
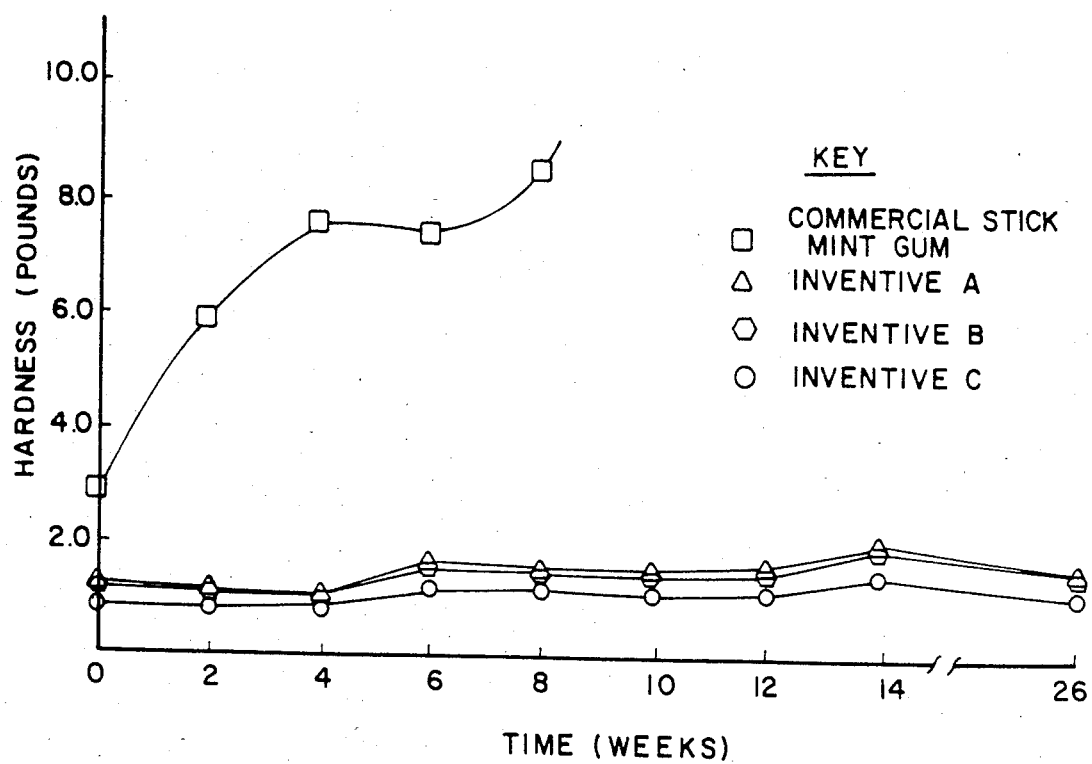

The results of these tests, shown graphically in FIG. 4, indicate the inventive formulations made by the inventive process retain their flexibility and softness as reflected by the nearly constant results of the hardness tests. The inventive formulations remained soft and flexible and had the organoleptic properties of freshly made gum even after 26 weeks at 23° C./23% relative humidity.

As indicated in the same figure, the commercial doublemint product steadily became harder and after 8 weeks was over 4 times harder, and therefore staler, than the inventive product after 26 weeks.

Figure 5:
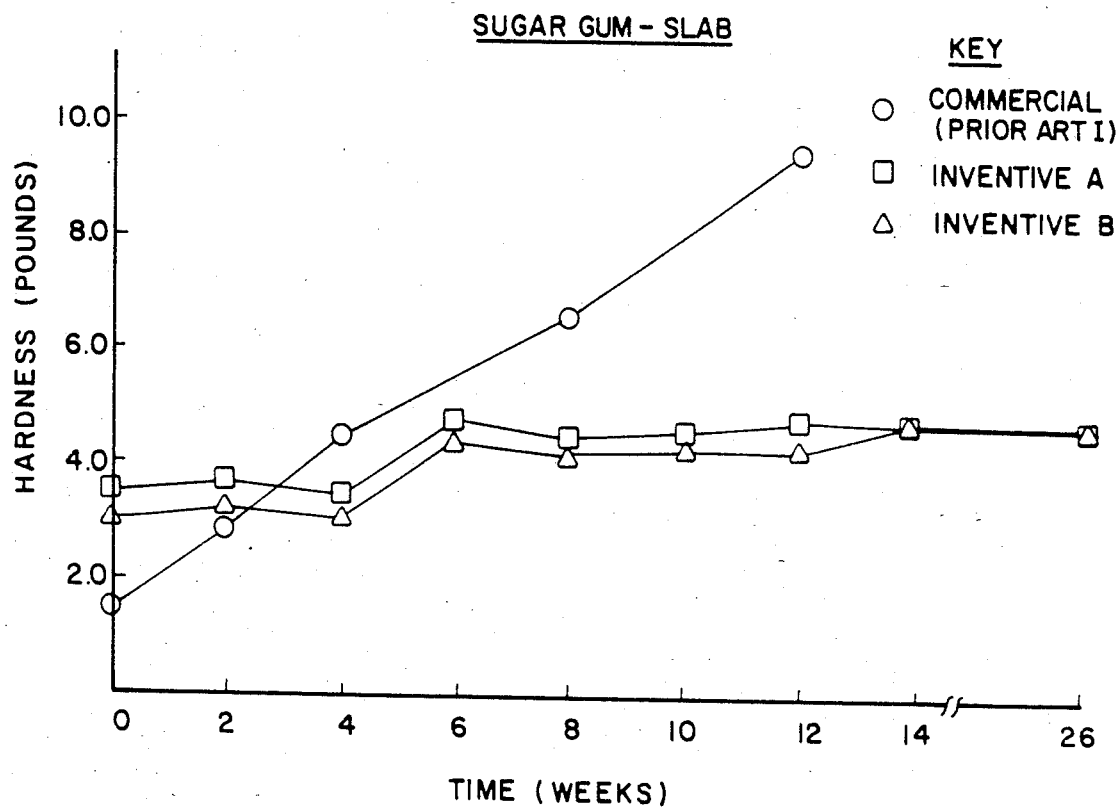

FIG. 5 shows inventive formulations A & B having been formed into slab chewing gum and compared with conventional, commercially available slab chewing gum under the same conditions as above (23° C./23% RH). The results demonstrate that the inventive product retains its softness, indicated by little change of its hardness over time. The competitive product, on the other hand, clearly becomes much harder over time, indicting its proneness to staling.

Figure 7:
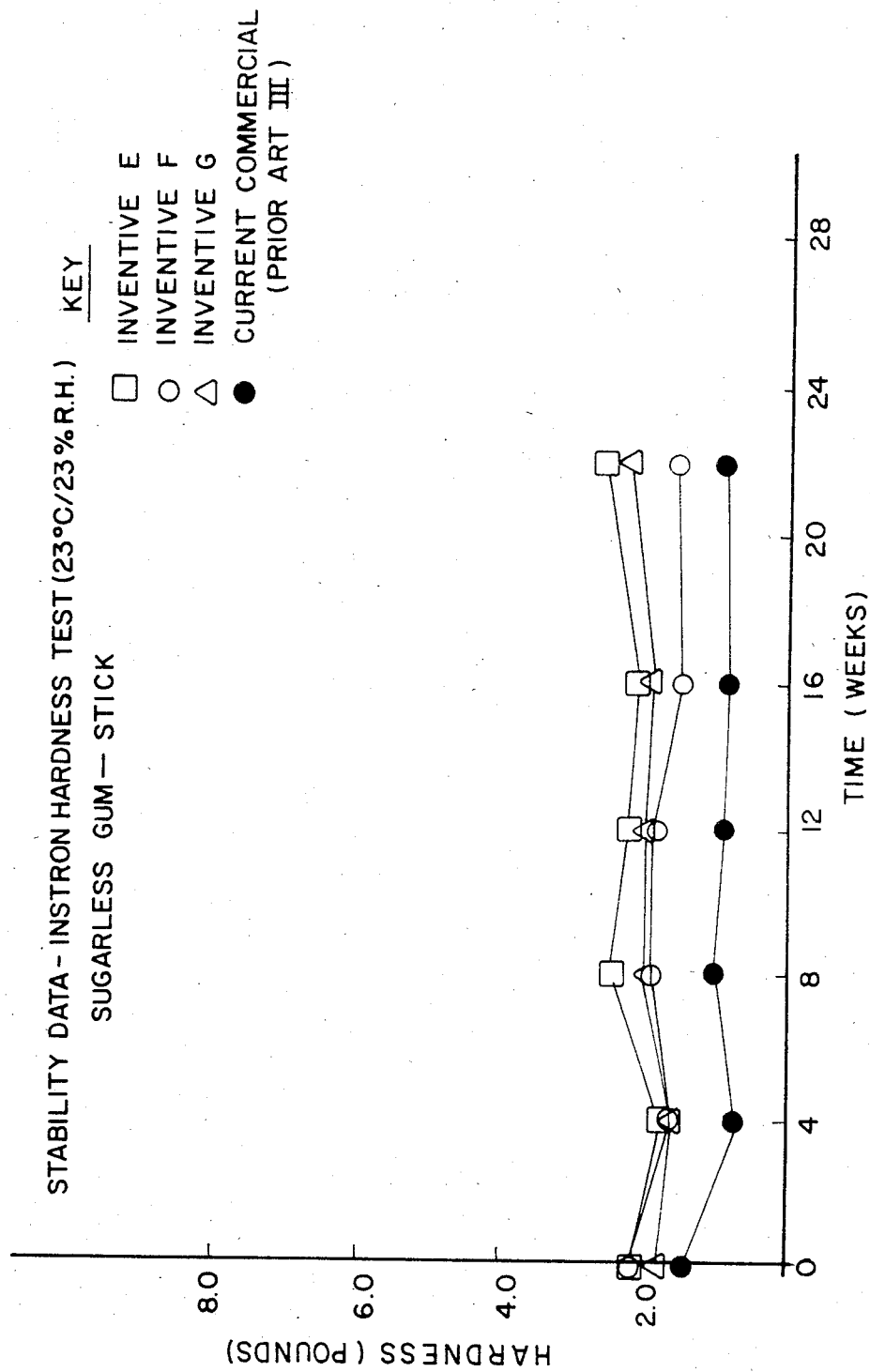

FIG. 7 shows the results of the accelerated aging tests conducted in the same manner on sugarless gum. The results after 22 weeks indicates that the inventive compositions are comparable to the current commercial products in retention of softness and flexibility as reflected by insignificant changes over time in hardness.

Quantitative Determination of Moisture Pick-up

Chewing gum pieces made from each of the inventive formulations A-C and using the inventive process were prepared, weighted and put into a dessicator containing a saturated solution of ammonium chloride to induce 80% RH. The dessicator is then placed in a 27° C. incubator. The gum pieces are then reweighted weekly for 5 consecutive weeks. The weight change is attributed to moisture pick-up and the % dewing is calculated therefore as follows:

$$\frac{\text{New Weight} - \text{original weight}}{\text{original weight}} \times 100 = \% \text{ dewing}$$

The same procedure was used to test commercially available competitive products.

Figure 6:
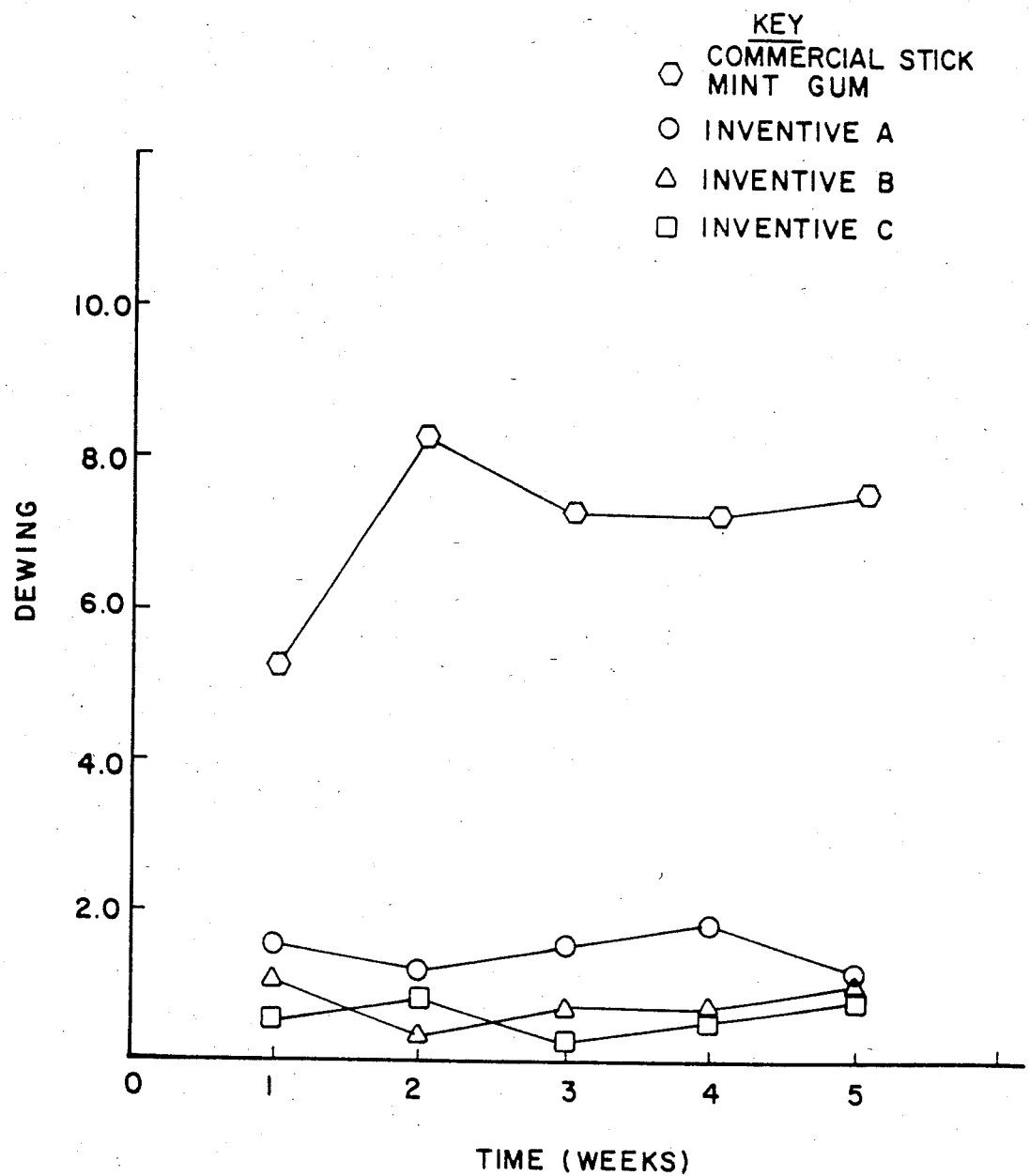

The results of these tests, depicted graphically in FIG. 6, indicated that inventive formulations prepared by the inventive process show insignificant change in % dewing after 5 weeks at 27° C./80% RH. The commercial doublemint product, however, showed a marked increase in moisture pick-up between the first and second weeks and a decrease in moisture pick-up in weeks 3-5.

It is apparent that the inventive formulations are extremely stable in the presence of extreme humidity conditions, whereas the current comparable commercial chewing gums have high moisture pick-up and are relatively unstable in this regard.

Sweating Tests

A visual determination of surface coating loss was conducted on factory wrapped product of the instant invention and compared with the comparable competitive product. The packages are air-tight either by fin-sealing or over-wrapping with plastic and placed in an incubator at 40° C. The packages are removed from the incubator weekly for 5 consecutive weeks and 3 gum pieces of each package are visually examined for surface coating change.

The results of these tests, shown graphically in FIG. 4, indicate the inventive formulations made by The degree of sweating was judged on the following scale:
0—No sweating
1—very slight sweating (little disappearance of coating)
2—Light sweating (same disappearance of coating)
3—Moderate sweating (disappearance of coating—degree of sticking of wrapper due to moisture is noted)

The results of the inventive chewing gum compositions for each visual examination was "0," indicating no sweating and no development of moisture, despite the extreme temperature for an extended period of time.

The comparable competitive products showed slight sweating ("1").

EXAMPLE TWO

The following comparative example is intended to demonstrate that the instant compositions cannot be made into chewing gum product when the temperature of the gum base exceeds about 60° C.

Chewing gum batches containing 28% base, 65% sugar, 7% softener were mixed at temperatures of 49°, 52°, 55°, 57°, 60°, 64° and 66° C. respectively. The gum base in each case was formulated in accordance with the inventive process. Accordingly, the base was heated to the indicated temperatures to soften it. The inventive process as outlined in FIG. 1 was followed.

The gum bases which were softened at 49°, 52°, 55° and 60° C. respectively, exhibited good viscosity and continuity and were easily processable into chewing gum formulations using the inventive formulations A-C. Those gum bases which were heated to 64° and 66° C. respectively, exhibited a break down in fiber and elasticity and a viscosity which was too low to be processable in conventional chewing gum equipment. When attempts were made to extrude chewing gum compositions containing these bases, they were unsuccessful due to the formation of granular chunks of gum which separated out. Those chewing gum compositions which were prepared from gum base which had been heated above 60° C. did not form a continuous rope when attempts were made to extrude it. Rather, granular chunks of the chewing gum composition separated out, causing extrusion to be unsuccessful and the result was the chewing gum product could not be made.

We claim:

1. A chewing gum composition having a moisture content of up to about 0.9% by weight of the final composition, comprising a gum base which softens in a temperature range of about 40° C. to about 60° C., a solid water-souble sweetening agent, a softener and a liquid flavoring agent, said chewing gum having an equilibrium relative humidity value lower than the ambient relative humidity, wherein said gum base is an elastomer selected from the group consisting of isobutylene-isoprene copolymers, polyvinylacetate, polyisobutylene, polyvinylalcohol, chicle, jelutong, balata, crown gutta-percha, lechicaspi, sorva and mixtures thereof.

2. The chewing gum composition of claim 1 wherein the gum base softens in a temperature range of about 50° to about 55° C.

3. The chewing gum composition of claim 1 wherein the sweetener is selected from the group consisting of water-soluble sweeting agents, water-soluble artificial sweeting agents, dipeptide based sweeteners and mixtures thereof.

4. The chewing gum composition of claim 1 wherein the flavoring agent is sorbed in the microporous channels of spherical particles having a bulk density of about 3.0 up to about 15.0 lbs/cu.ft.

5. The chewing gum composition of claim 4 wherein the spherical particles are selected from the group consisting of dextrins, starch pectrin algin methyl cellulose, carboxymethyl cellulose, carboxymethyl amylopectin, dextrose, fructose, maltose, lactose, dextrans, natural gums and mixtures thereof.

6. The chewing gum composition of claim 5 wherein the sphericals are maltodextrins having a bulk density of about 3.0 to about 6.0 lbs./cu.ft.

7. The chewing gum composition of claim 6 wherein the flavoring agent is a natural or synthetic material selected from the group consisting of natural oils, natural essences or extracts, synthetic oils and mixtures thereof.

8. The chewing gum composition of claim 7 wherein the flavoring agent is selected from the group consisting of peppermint oil, spearmint oil, cinnamon oil, oil of wintergreen, fruit flavors and mixtures thereof.

9. A chewing gum composition comprising from about 5 to about 65% by weight of a gum base which softens in the temperature range of about 40° C. to about 60° C., a solid water-soluble sweetening agent, a softener and remaining ingredients selected from conventional chewing gum additives, said chewing gum having an equilibrium relative humidity value lower than the ambient relative humidity.

10. The composition of claim 9 wherein the chewing gum is coated prior to wrapping without regard to humidity and at ambient temperatures.

11. The composition of claim 9 wherein the chewing gum piece is formed therefrom in a slab, stick, chunk, pillow or tablet form.

12. A process for preparing a chewing gum composition which comprises:
   (a) softening the gum base in a temperature range of about 40° C. to about 60° C.;
   (b) admixing with the gum base a sweetening agent and a flavoring agent and continuing to mix until a homogenous, pliable mixture having an equilibrium relative humidity value lower than the ambient relative humidity is obtained;
   (c) extruding the composition;
   (d) forming the composition into suitable chewing gum pieces without cooling; and
   (e) wrapping without prior conditioning.

13. The process of claim 12 wherein the chewing gum pieces are coated with a sweetener prior to wrapping in a relative humidity of between about 30% to about 30% and at ambient temperatures.

14. A chewing gum composition which remains fresh for a year or more with a minimum of protective wrapping, having a moisture content of up to about 0.9% by weight and being capable of being extruded, formed, coated and wrapped without cooling or conditioning, said composition comprising:
   (a) a gum base having a softening range of about 40° C. to about 60° C.;
   (b) a flavoring agent, said ingredients containing only residual moisture and being added to the composition without additional moisture; said composition being prepared by the process comprising:
      (i) softening the gum base between a temperature range of about 40° C. to about 60° C.;
      (ii) admixing softening agents, sweetening agents, and flavoring agents;
      (iii) extruding the composition;
      (iv) forming the composition into suitable chewing gum pieces without cooling; and
      (v) wrapping the pieces without prior conditioning.

* * * * *